United States Patent [19]
Hara et al.

[11] Patent Number: 5,375,061
[45] Date of Patent: Dec. 20, 1994

[54] MANUFACTURING MANAGEMENT AND APPARATUS FOR A SEMICONDUCTOR DEVICE

[75] Inventors: Kenjiro Hara, Yokohama; Atsunori Kajio, Kawasaki, both of Japan

[73] Assignee: Kabushiki Kaisha Toshiba, Kawasaki, Japan

[21] Appl. No.: 799,181

[22] Filed: Nov. 27, 1991

[30] Foreign Application Priority Data

Nov. 27, 1990 [JP] Japan .................. 2-324331

[51] Int. Cl.$^5$ .................. G06F 15/24; G06F 15/46
[52] U.S. Cl. .................. 364/468; 364/403; 364/478
[58] Field of Search ............... 364/468, 148, 156, 149, 364/478, 401, 402, 403, 474.11, 474.15; 395/919, 920, 904, 925, 926

[56] References Cited

U.S. PATENT DOCUMENTS

| | | | |
|---|---|---|---|
| 4,457,772 | 7/1984 | Haynes et al. | 364/473 |
| 4,459,663 | 7/1984 | Dye | 364/200 |
| 4,646,238 | 2/1987 | Carlson, Jr. et al. | 364/403 |
| 4,852,001 | 7/1989 | Tsushima et al. | 364/401 |
| 4,866,628 | 9/1989 | Natarajan | 364/468 |
| 4,994,980 | 2/1991 | Lee et al. | 395/904 |
| 5,170,355 | 12/1992 | Hadavi et al. | 364/468 |

*Primary Examiner*—Joseph Ruggiero
*Attorney, Agent, or Firm*—Foley & Lardner

[57] ABSTRACT

A production management method in a production system for semiconductor devices uses processing progress information for each of the plural number of manufacturing apparatus as the basis for performing start allocation of a plural number of next start product groups. When the state of progress has reached a certain stage and is close to the end, a product group of the same type as that which a manufacturing apparatus is processing from amongst start standby product groups is determined as the object of same type priority allocation. A link is made beforehand between that product group and a manufacturing apparatus for which that processing is about to end, and a product group that is an object of same type priority allocation to a manufacturing apparatus that is processing products of that same type, is not started by a manufacturing apparatus that is processing a product of a different type even if that manufacturing apparatus finishes its processing of a product of that different type earlier.

5 Claims, 7 Drawing Sheets

MANUFACTURING MANAGEMENT AND APPARATUS FOR A SEMICONDUCTOR DEVICE

BACKGROUND OF THE INVENTION

The present invention relates to a manufacturing management method in a semiconductor device production system, production management apparatus, or apparatus for manufacture of a production management apparatus, and, more particularly, relates to a production management method and apparatus in a production system for semiconductor devices which can greatly improve production efficiency while reducing the switching frequency of processing by manufacturing apparatus in parallel.

In production systems for semiconductor devices, there are those where a plural number of manufacturing apparatus are provided in parallel, so as to enable the processing of a plural number of types of semiconductor products, and a plural number of product groups for manufacture next are in standby, for the next product standby portion, so that when there is a manufacturing apparatus that can process the next products, a production management apparatus, that includes a computer, performs start scheduling for those next products so that a manufacturing apparatus that can perform processing for that next product starts manufacture for one next product standby group from a plural number of product standby groups.

In this type of production system, the start scheduling is generally performed as real time scheduling in accordance with production completion reports from each manufacturing apparatus.

FIG. 1 shows a time series processing system for the manufacture of semiconductor devices.

In this figure, first. T represents the time axis. Downward indication represents the future while reported indicator represents the past.

The apparatuses 1, 2, ..., n are apparatus for the assembly of semiconductor devices. Each configure a single production line that is incorporated into the production system, and each perform the same processing, for a plural number of types of semiconductor products as described above, through the switching of jigs and tools and their setting up. Furthermore, these apparatuses 1, 2, ..., n have a production completion information function, as shown as the flowchart of FIG. 2. This is to say that the apparatuses 1, 2, ..., n check for whether or not production is completed for all of the group of products that has been started in step ST801, and when production is completed, production completion information is sent to a host computer in ST802, with transmission in the direction of the production management apparatus.

Symbols p1–p6 show the product group, and A–D show the types of each of the corresponding product groups p1–p6. Accordingly, the product type of the product group p1 is A, the product type of the product groups p2 and p3 is B, the product type of the product group p4 and p5 is C, and the product type of the product group p6 is D.

The solid line $L_{11}$ shows when the apparatus 1 handles the product group p1, the broken line $L_{12}$ shows when the apparatus 1 handles the product group p2, the solid line $L_{21}$ shows when the apparatus 2 handles the product group p3, the broken line $L_{22}$ shows when the apparatus 2 handles the product group p4, the solid line $L_{31}$ shows when the apparatus 3 handles the product group p5, and the broken line $L_{32}$ shows when the apparatus 3 handles the product group p6.

The apparatus 1, 2, ..., n outputs completion information to the production management apparatus, when there is completion of processing for a single product group, and f1, f2, ..., fn are the production completion informations that are output by each apparatus 1, 2, ..., n.

Symbols s are product shelves for a plurality of next start standby product groups (in other words, a buffer). A single product group contains a plural number of products of the same type, which are started to each of the apparatus 1, 2, ..., n in the status where they are still contained in storage boxes.

The following is a description of the scheduling by a production management apparatus of a production system as described above.

First, at a time prior to the time t71, the apparatus 1 performs assembly processing for the product group p1, the apparatus 2 performs assembly processing for the product group p3, and the apparatus n performs respective assembly processing for the product group p5.

Then, when the apparatus 1 has completed the processing for the product group p1, the production completion information f1 is given to the production management apparatus at the time t71.

When this occurs, the production management apparatus that receives it determines the next product that is to be started by the apparatus 1, from the start standby product groups that are on standby in the shelves s. This is performed in accordance with predetermined priority rules. These priority rules take FIFO (first-in-first-out) as the premise, and when the shelves s have no product groups of the same type as the product group that was being processed by the apparatus that gave the production completion information, the oldest of the next start standby product groups is determined as the next start product, and when the shelves s have a product group of the same type as the product group that was being processed by the apparatus that gave the production completion information, then that is given priority and the start standby product group of the same time is determined as the next start standby product group. Here, there are only the three product groups p2, p4, p6 on the shelves s shown in the figure, and the order of priority is determined as p2, p4, p6 in accordance with the FIFO rule. Accordingly, in this case, when the next start product is determined, the production management apparatus gives the start instruction so that the product p2 is pulled in the direction of the apparatus 1. In this case, the set-up change instruction accompanies the product change.

With this, the product p2 is started by the apparatus 1.

In the same manner, at the time t72, the production completion information f2 is given from the apparatus 2 to the management apparatus for the product p3 of the same type B, but even at this time, there is no product of the same type since the product of the same type B has already been started to the apparatus 1 and so the product C is started to the apparatus 2 in accordance with the FIFO rule.

Furthermore, at the time t73, the production completion information fn is given from the apparatus N to the management apparatus for the product p5 of the same type C. But even at this time, there is no product of the same type, since the product of the same type C has already been started by the apparatus 2. So, the product D is started by apparatus n in accordance with the FIFO rule.

In this manner, the product groups on standby in the shelves s are successively started by empty machines by a scheduling of the product management apparatus and production is implemented.

However, when there is switching of the processing type for the same apparatus, a set-up change is performed when there is the start of the product group as described above but with a conventional production management method as described above, there are cases where the processing product is switched even though such switching of the processing product would not be necessary if there were a short wait time, i.e., an increase in the number of times of changing the setting-up.

At the time t71, there is the start of the product group by the apparatus 1, and that at the time t72, there is the start of the product group p4 by the apparatus 2.

It requires time and trouble to change the setting-up in a production system and the production period becomes longer for unnecessary changes of the setting-up. This creates increased loads on the workers.

As has been described above, in a conventional production system, there is therefore this problem of an increase in the frequency of unnecessary changing of the processing product.

SUMMARY OF THE INVENTION

In the light of these problems associated with the conventional management method, an object of the present invention is to provide a manufacturing method, a production management apparatus and an apparatus for manufacture of a production management apparatus, that can reduce the switching frequency of processing products of manufacturing apparatuses and greatly improve production efficiency.

The production management method of the present invention performs standby in a next start standby product of a plural number of next start standby product groups that are to be started by one of a plural number of manufacturing apparatus that each have the function of performing equivalent processing for a plural number of types of semiconductor products, and when there is an apparatus that is processing products of a same type as one of a plural number of next start standby product groups, uses processing progress information for each of the plural number of manufacturing apparatuses as the basis for performing start allocation of said plural number of next start product groups with respect to said plural number of manufacturing apparatus so that products are not started by a manufacturing apparatus that is performing the processing of products of a different type, and priority is given to the start with respect to a manufacturing apparatus that is processing products of the same type, even when there is a status where a manufacturing apparatus that is performing processing of products of a different product type can have start of products of the same type from within said plural number of next start standby product groups.

In a production system for semiconductor devices and performs, in a next start standby product standby of a plural number of next start standby product groups that are to be started, depending on one of a plural number of manufacturing apparatuses that each have the function of performing equivalent processing for a plural number of types of semiconductor products, and a manufacturing apparatus that can process the next product each time there is an apparatus in a status that enables processing of a next product from a plural number of next start standby product groups performing selective processing of a single next start standby product group from said plural number of next start standby product groups. The production management method of the present invention is provided with a means that when a production completion information is received from each of said plural number of manufacturing apparatus and products of the same type as the type of product that were being processed by the manufacturing apparatus that gave that production completion information exist in the next start standby product group, determines the manufacturing apparatus that gave the production completion information as the object for same type priority allocation for start of manufacture of a product of a same type instead of start to another manufacturing apparatus even if said other manufacturing apparatus is in a status that enables processing of a next product prior to the manufacturing apparatus that gave said production completion information, and a means that when a production completion information is received from each of said plural number of manufacturing apparatuses, determines a product of a same type as a next start product even if a product of the same type as a product that was being processed by a manufacturing apparatus that gave a production completion information at the time of receipt of the production completion information exists amongst the plural number of next start standby products, and when there are no products of the same type as a product that was being processed by a manufacturing apparatus that gave a production completion information, determines a product type other than a product type that was the object of priority allocation as the next start product and gives a next product start instruction to a manufacturing apparatus that gave the production completion information.

In a production system for semiconductor devices and provided with a production management apparatus that standby of a plural number of next start standby product groups in a next start product standby portion and performs scheduling on the basis of processing progress information relating to products being processed, the manufacturing apparatus of the present invention is provided with a means that gives a production completion information to said production management apparatus when a number of products remaining in processing has reached a set value.

According to the present invention, processing progress information in each of the manufacturing apparatus is used as information when there is a scheduling of next start product groups and when the state of progress has reached a certain stage and is close to the end, a product group of the same type as that which a manufacturing apparatus is processing from amongst start standby product groups is determined as the object of same type priority allocation, and a link is made beforehand between that product group and a manufacturing apparatus for which that processing is about to finish, and a product group that is an object of same type priority allocation to a manufacturing apparatus that is processing products of that same type, is not started to a manufacturing apparatus that is processing a product of a different type even if that manufacturing apparatus finishes its processing of a product of that different type earlier.

By this system, the frequency of switching the processing product is reduced and as in the case of the conventional technology, there are no problems in an increase in the number of types of switching the setting-up in cases where product switching is performed even when it would have been unnecessary had a short wait been available. Therefore it is possible to shorten the production period and to decrease the work load.

According to the present invention as described above, processing progress information in each manufacturing apparatus is used as information for scheduling when the next start product group is to be performed and when its progress had advanced to where it is close to completion, when the start standby product groups include a product group that is of the same type as that which is being processed, that product group is determined as the object of same type priority allocation, and a link is made between that product group and a manufacturing apparatus that is about to finish processing, and a "same type" allocation rule is given priority so that the product group that is the object of same type allocation is not started by a manufacturing apparatus that was processing products of a different type even if that manufacturing apparatus which was processing products of a different type completes it processing prior to a manufacturing apparatus that is processing products of a same type. Cases where products are switched would not have been necessary had there other been some time wait, are eliminated. So, there is a drop in the frequency of switching between processing products. The number of times changing the setting up is reduced. It is also possible to shorten the production period and decrease the work load.

BRIEF DESCRIPTION OF THE DRAWINGS

In the appended drawings.

DETAILED DESCRIPTION OF THE PREFERRED EMBODIMENTS

The following is a detailed description of preferred embodiment of the present invention, with reference to the appended drawings.

Figure 1:
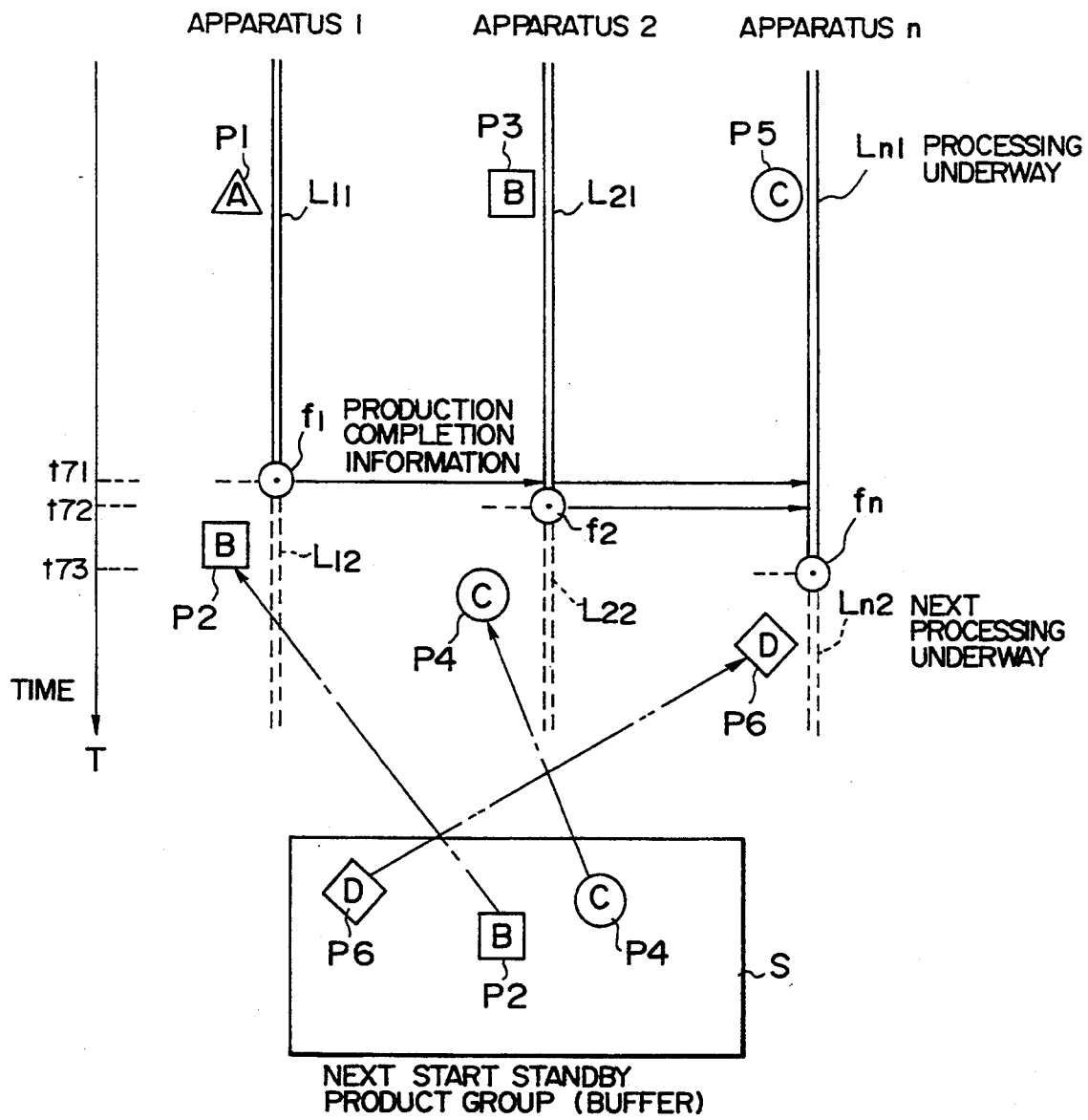
FIG. 1 is a view describing the time sequence of scheduling according to a conventional assembly system.
Figure 2:
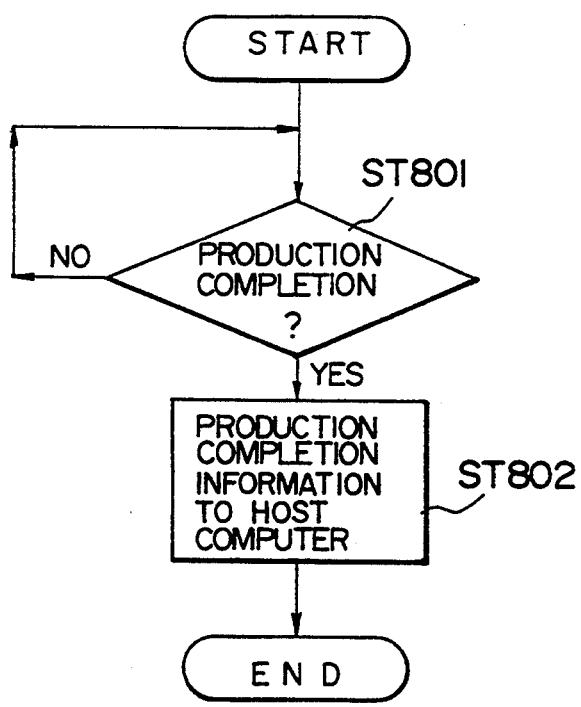
FIG. 2 is a flowchart that shows the processing contents of an information function with respect to a host order computer of the assembly apparatus of claim 1.

First, in the case of the apparatus 1, 2, ..., n shown in FIG. 1, whereas the information function to the host computer is only for a production completion information function, in the case of the apparatus 1, 2, ..., n of the present embodiment (refer to FIG. 3 and FIG. 4), there is also a production completion prediction information function in addition to the production completion information function.

Figure 4:
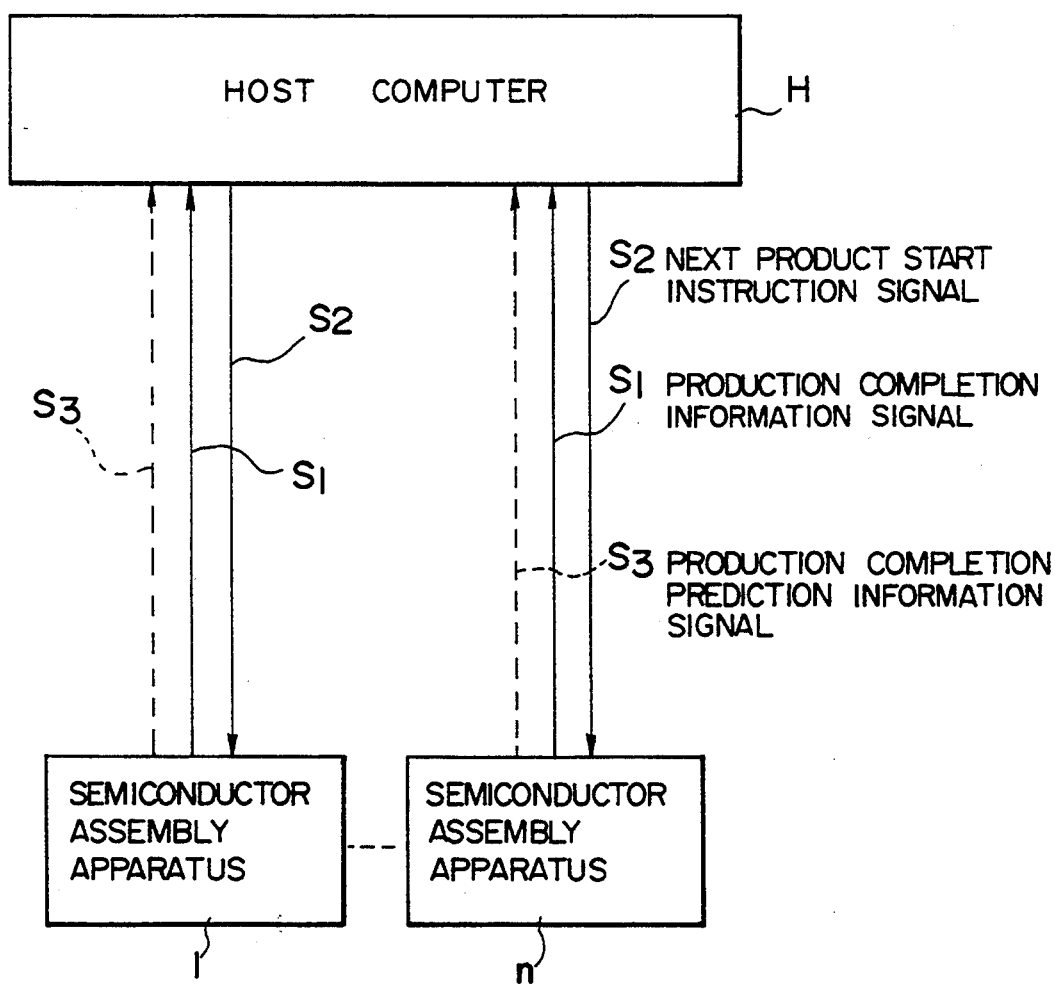
FIG. 4 is a block diagram of the assembly system relating to a first embodiment of the present invention.

The apparatuses 1, 2, ..., n shown in FIG. 4 output the production completion prediction signals $S_3$ and the production completion signals $S_1$ to the host computer H which is the production management apparatus. The predetermined production completion prediction signals $S_3$ are generated when the processing has proceeded to a certain extent and are generated prior to the production completion signals $S_1$.

Figure 5:
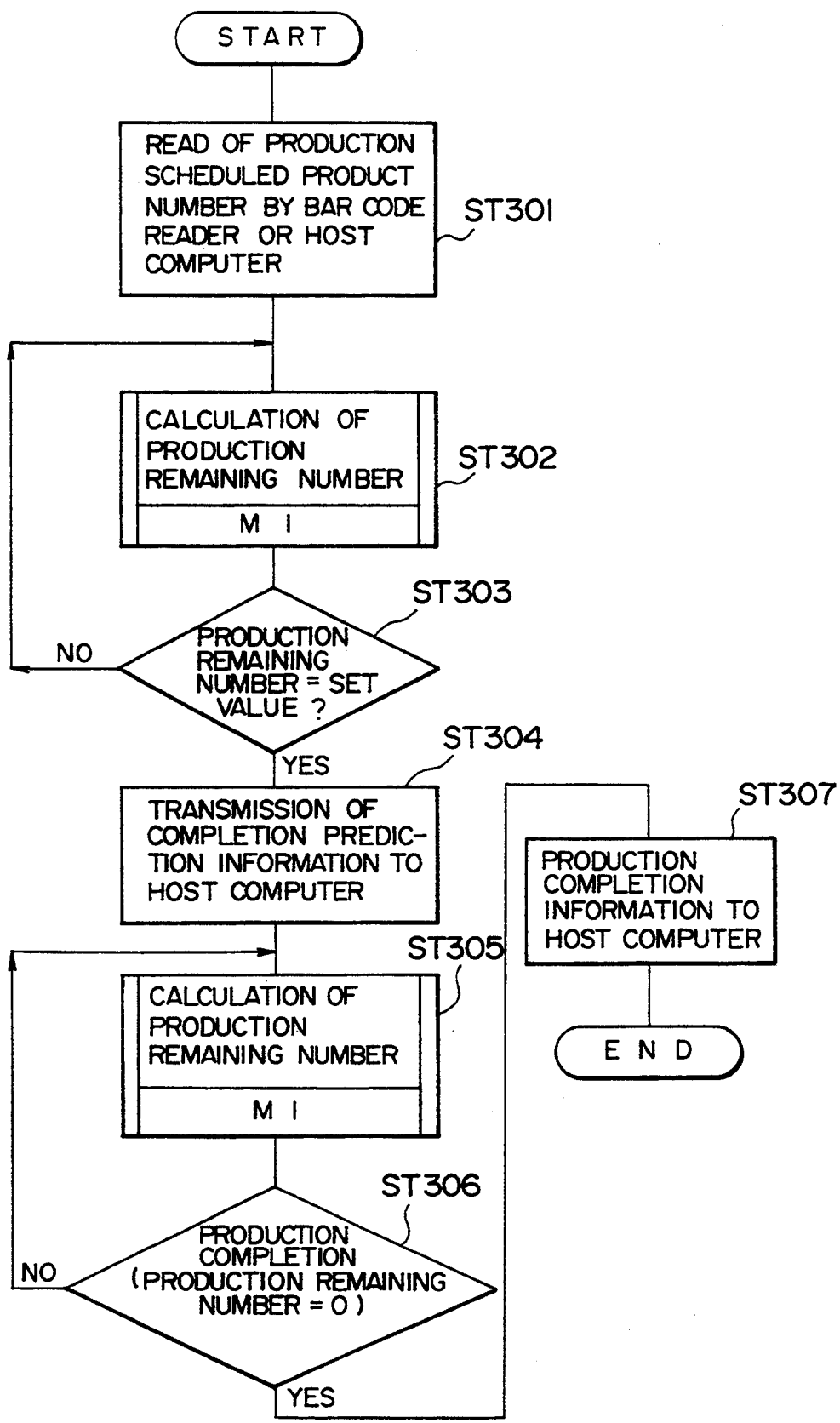
FIG. 5 is a flowchart showing the information processing contents, with respect to a host order computer, of the assembly system relating to a first embodiment of the present invention.
Figure 6:
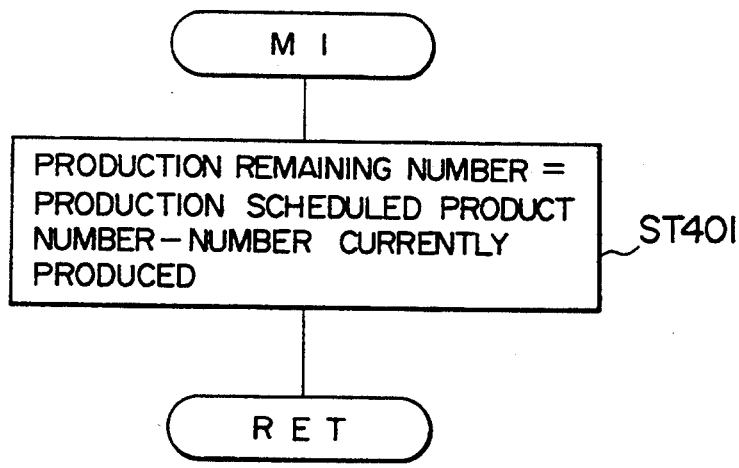
FIG. 6 is a flowchart showing the processing contents with respect to production remaining processing.

FIG. 5 and FIG. 6 are flowcharts that show the function for scheduling for each of the apparatus 1, 2, ..., n.

Figure 7:
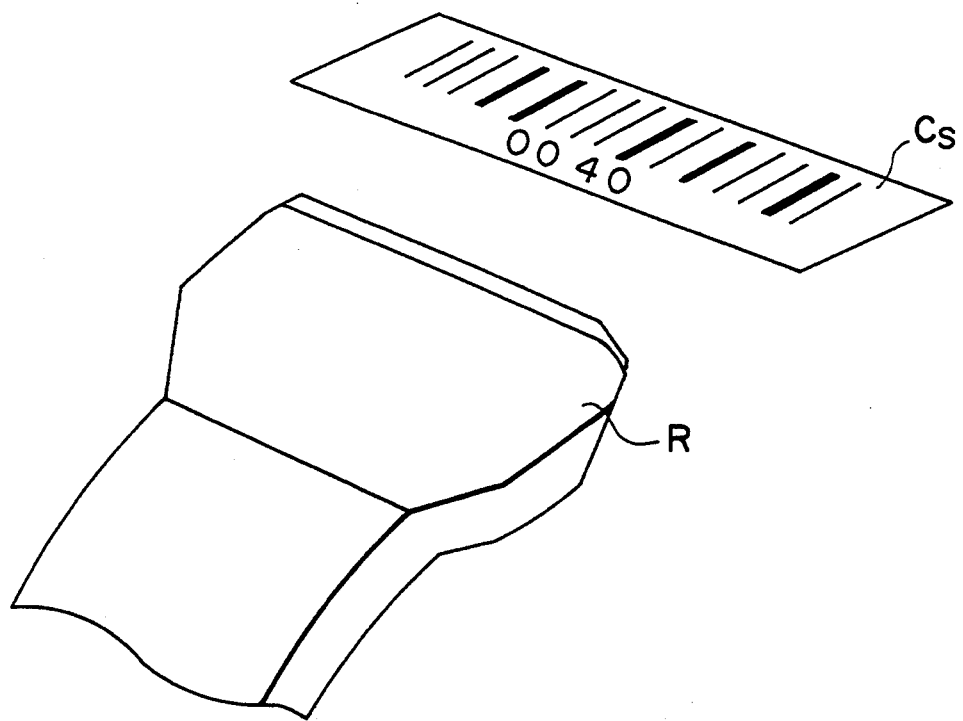
FIG. 7 is a view describing a bar code label and a bar code reader as one means used for the input of a production scheduled production number in an assembly apparatus.

In FIG. 5, first in step ST301, the number of products of the product group that are to be started, that is, the production scheduled product number, is taken by reading by the signals from the host computer H or read by the bar code reader R shown in FIG. 7.

In the case of a bar code reader, the bar code reader R is installed on each of the apparatuses 1, 2, ..., n. A bar code, such as shown shown in FIG. 7, is affixed to the storage case as the seal $C_s$, or is printed on the storage case itself, and is read prior to start of the product group.

Figure 8:
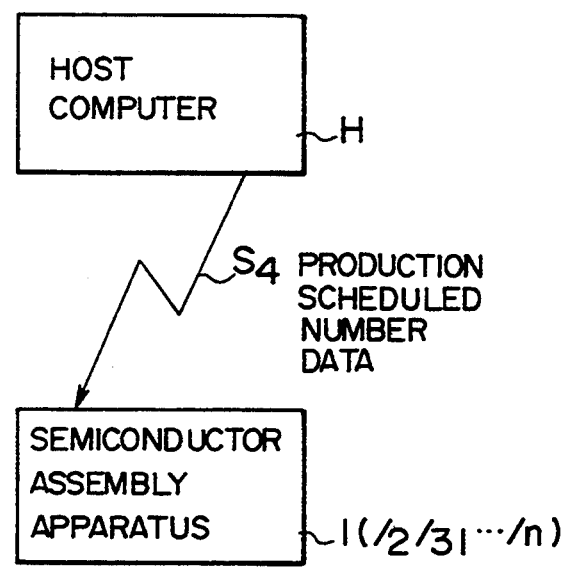
FIG. 8 is a view describing a data supply status to an assembly apparatus from a host order computer as another means used for the input of a production scheduled production number in an assembly apparatus.

In the case of signals from the host computer H, the product number of each product group is made known beforehand to the host computer H and the production completion prediction signals $S_3$ are transmitted from the host computer H to each of the apparatus 1, 2, ..., n as shown in FIG. 8, along with the start instruction.

Then, in step ST 302, there is the calculation of the production remaining number. This is performed for each processing completion of one product, and is determined by the execution of the subroutine M1. As shown in FIG. 8, this subroutine performs subtraction from the production scheduled product number read in step ST301.

After completion in step ST303, a judgment is made for whether or not the production remaining number calculated in step ST302 is equal to the set value. In other words, this recognizes whether or not there is the timing for the giving of the production completion prediction signals $S_3$.

When the judgment in this step ST303 is N (NO), there is return to step ST302. Because of this, the steps ST302 and ST303 are repeatedly performed until there is the timing for the giving of the production completion prediction signals $S_3$.

When the judgment in this step ST303 is Y (YES), the apparatus proceeds to step ST304.

In step ST304, the production completion prediction signals $S_3$ to the host computer H are given to the host computer H.

Then, in the next step ST305, there is the same processing as for step ST302. In step ST306, there is a comparison with the value determined here and "0". That is to say, a check is made for whether or not production is completed for all of the products of the product group.

If the judgment in step ST306 is N, there is return to step ST 305. Accordingly, the steps ST305, ST306 are repeatedly executed until there is the timing for the giving of the production completion signals $S_1$.

If the judgment in step ST306 is Y, then in step ST307, the production completion signals $S_1$ are given to the host computer H.

When the host computer H receives the production completion prediction signals $S_3$ from the apparatus 1, 2, ..., n as described above, if amongst the start standby product groups there is a product group of the same type as that which that manufacturing apparatus is processing, then that product group is determined as the object of same type priority allocation. A link is then made between that product group and a manufacturing apparatus for which processing is about to end, so that a product group that is the object of same type priority allocation is not started by an assembly apparatus that was processing products of a different type, even if the manufacturing apparatus that was processing products of a different type finishes processing prior to a manufacturing apparatus that is processing products of a same type.

More specifically, in the host computer H, scheduling is performed in accordance with the following rule each time there is the receipt of a production completion signals from each apparatus 1, 2, ..., n.

First, a manufacturing apparatus that gave a production completion information when there is the receipt of a production completion information, judges whether or not, amongst the next start standby product groups, there is a product of the same type that that manufacturing apparatus was processing.

As the result of this judgment, that product group is determined as the next start standby product group if there is a product of that same type.

In addition, as the result of that judgment, there is a product of that same type, then an oldest product group from amongst the products other than those products that are the object of the priority allocation described above, is determined as the next start standby product group in accordance with the FIFO rule.

Figure 3:
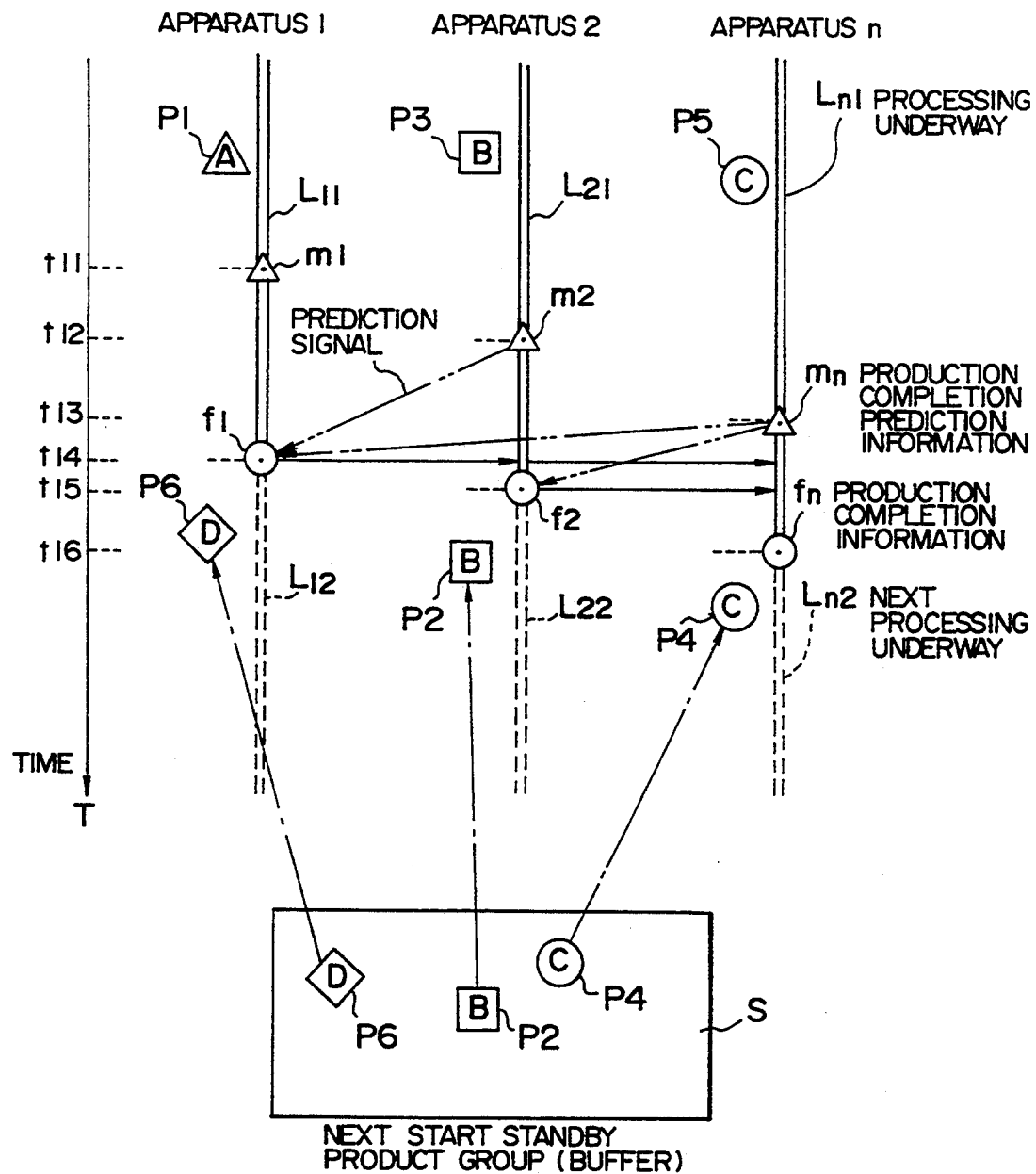
FIG. 3 is a view describing the time sequence of scheduling according to an assembly system relating to a first embodiment of the present invention.

FIG. 3 is a view for describing the time sequence of scheduling according to an assembly system relating to a first embodiment of the present invention. Here, those portions that correspond to similar portions of FIG. 1 are indicated by corresponding numerals. The following is a description of only those portions that differ from FIG. 1.

In the figure, the solid line $L_{11}$ shows when the apparatus 1 handles the product group p1, the broken line $L_{12}$ shows when the apparatus 1 handles the product group p2, the solid line $L_{21}$ shows when the apparatus 2 handles the product group p3, the broken line $L_{22}$ shows when the apparatus 2 handles the product group p4, the solid line $L_{31}$ shows when the apparatus 3 handles the product group p5, and the broken line $L_{32}$ shows when the apparatus 3 handles the product group p6.

Symbols m1, m2, ..., mn are the production completion informations of the production completion prediction signals $S_3$. These are given from each of the apparatus 1, 2, ..., n.

The following is a description of scheduling by a production management apparatus of the production system described above.

First, at a time prior to the time t11, the apparatus 1 performs assembly processing for the product group p1, the apparatus 2 performs assembly processing for the product group p3, and the apparatus n performs respective assembly processing for the product group p5.

Then, when the apparatus 1 has approached the completion of the processing for the product group p1, the production completion prediction information m1 is given to the host computer H at the time t11.

When this is done, the host computer H judges whether or not amongst the start standby product groups p2, p4 and p6 there is a processing group of the same type as that which the assembly machine 1 is processing. In this case, the apparatus 1 is processing a product group of the type A, and there is no product of the same type. Thus there is no determination of the object of same type priority allocation.

Then, when the apparatus 2 approaches the completion of processing for the product group p3, the production completion predication information m2 is given at the time t12 to the host computer H.

The host computer H then performs the same judgment as when the information m1 was received, for the product group p3 that the assembly machine 2 is processing. At this time, the product type of the product group p3 is B, so the product group p2 which is a product of the same type is determined to be the object of same type priority allocation.

The same processing as when the information mn from the apparatus n was received at the time 13 is performed. The product group p4, which is of the same type as the product group p5 is determined as the object of same type priority allocation.

First, the apparatus 1 completes processing for the product group p1 and at the time t14, the production completion information f1 is given to the host computer H.

When this occurs, the host computer H that has received this determines the product (next start product) of the next start standby product groups that are on standby in the shelves s, that is to be next started by the apparatus 1, in accordance with the priority rules described above. Here, there are only three product groups p2, p4 and p6 on the shelves s, as shown in the figure in accordance with the FIFO rule, priority is given in descending order of product group p4, p2 and p6. In this case, there is no product group of the same type on the shelves s, with respect to the processing for the product group of the product type A at the time t14 for the apparatus 1. Because of this, the product group p6, that is not an object of same type priority allocation, is determined as the next start product group, and the product group p2 that is to be started beforehand in accordance with the FIFO rule is not started by the apparatus 1.

The host computer H gives the start instruction to pull the product type p6 to the apparatus 1 when it has been determined as the next start product. In this case, a set-up change instruction accompanies the product type change.

In the same manner, at the time t15, the production completion information f2 is given from the apparatus 2 to the host order computer H for the product p3 of the product type B. At this time, the product group p2 of the product type B, that has been already determined as the object of same type priority is started by the apparatus 2, and there is no set-up change instruction.

Furthermore, at the time t16, the production completion information fn is given from the apparatus n to the management apparatus for the product p5 of the product type C. At this time as well, the product group p4 of the same type as that determined as the same type priority object is started, the apparatus n, and there is no set-up change instruction.

In this manner, the product groups on standby in the shelves s are successively started by empty apparatus in accordance with the scheduling according to the product management apparatus and the processing is implemented.

Moreover, in the embodiment described above, the number of products of the product group that are started can be detected by a bar code reader R and a bar code display provided to a special storage case, but the present invention is not limited to this configuration, and another equivalent configuration that can determine a number of supplied products beforehand can be used. For example, cases that store a product group can be stacked and supplied, and the status where the height of these stacked cases gradually decreases, the accompanying supply can be detected by a level sensor. The use of such bar codes and level sensors enables the automatic and stable detection of the started number of products, but an ID card or some other discriminatory identification can be set manually for a predetermined number of cases stored in said product groups. This can be read by a reading apparatus. Using ID cards the like performs the semiautomatic detection of a number of remaining products but this can be sufficiently used at the level of implementation.

In this manner, according to the present embodiment, cases where products are switched even product switches would not have been necessary were there some wait time, are eliminated, and there is a drop in the frequency of switching between processing products, the number of times of changing the setting up is reduced, and it is also possible to shorten the production period and decrease the work load.

The present invention is applicable when there is the assembly (or more specifically, the bonding) as an after processing of the semiconductor device. The production system for semiconductor devices generally consists of pre-processing and post-processing. Pre-processing refers to thermal processing, dispersion, deposition, chemical vapor deposition (CVD) and other physical and chemical processing. Production management for this pre-processing is easily performed by determining processing end times beforehand so as to determine the required times for each processing. With respect to this, the post-processing is processing after completion of the semiconductor elements of a certain extent in the pre-processing, and is processing for the setting of the elements to lead frames and the like, the connection by wire bonding of frame terminals and element terminals, or the encapsulation by resin or the like, of the elements and the frames. In this post-processing, even if a large number more than a certain number of products are started by a system together, each processing requires a different time for each product type. One portion of the machines of the system stop sometimes due to failures of jigs and breaking of wires, and so it is not possible to determine the processing end times beforehand. Accordingly, it has not been possible in the past to have read in the post-processing.

However, about one hour and a half is required for all of the post processing to be completed. If there is prediction information given about 10 minutes prior to the end time, then there is the merit of eliminating waste in the operation of semicondcutor assembly apparatus provided in parallel and about several tens in number. The present invention, focuses on the requirement of production plants for this wasted operation of assembly apparatus to be eliminated as far as possible, and that it has not been possible to read ahead in post-processing. More specifically, the present invention performs management of a production system by selectively satisfying the requirement that (1) in a production system provided with several tens of assembly apparatus, if an information is given for the processing end time of each of the assembly apparatus, unnecessary changing in response to the fabrication of products of different types will be lessened, and (2) if there is to be changing the setting-up of the assembly apparatus accompanying changes in the mechanical configuration for changing tools, then such changes require from several tens of minutes to about one hour in an actual production plant. So it is definitely better not to change the mechanical configuration. In other words, in cases where, rather than performing troublesome change of the configuration and changing the jigs, there is less loss in the system overall if the time until the end of processing in another apparatus that has the same configuration and which will not need to be changed, is first checked and the product started to that apparatus instead of changing another apparatus. The present invention is featured in that efficient management is performed for the system as an entirety.

What is claimed is:

1. A manufacturing apparatus, in a production system having a production management apparatus for managing a plurality of manufacturing apparatuses, each producing various kinds of products, comprising:

storage means for storing a predetermined number of products as a start standby product group;

detection means for detecting a number of products remaining in said product group stored in said storage means; and report means for giving production completion information to said production management apparatus when the number of products remaining in processing has reached a set value.

2. The manufacturing apparatus as set forth in claim 1, wherein:

said storage means has a required number of products configured by stacking a plural number of cases that are stored as a single unit, each of said number of stacked cases having a bar code affixed, and said detection means includes a detection and read portion which detects the remaining product number and identifies said start standby product group by reading said bar code.

3. The manufacturing apparatus as set forth in claim 1, wherein:

said storage means is configured from a plural number of stacked cases that store a predetermined number of products as a unit, and said detection means is configured from a sensor that detects a remaining number of product that configure said start standby product group, by detecting the height of a plural number of said stacked cases.

4. A production management method in a production system for semiconductor devices, comprising:

the step of creating a next start standby product group, including a plurality of semiconductor products of different kinds, located at a predetermined standby portion, said plurality of kinds of products being respectively supplied to any of a plurality of manufacturing devices, each of which can process a plurality of kinds of semiconductor products;

the step of detecting kinds of said plurality of products constituting said next start standby product group, which are on a standby status at said predetermined standby portion;

the step of detecting each kind of product which is presently being processed by each of said plurality of manufacturing devices and, at the same time, detecting a future prediction time for the processing of each product being processed by each of said plurality of manufacturing devices without resort to a timer;

the step of determining whether or not a particular kind of the next start product is included in said next start standby product group on said predetermined standby portion coincides with the kind of product processed by a predetermined manufacturing device which will be in a next position to end processing;

the step of supplying said next start product to said predetermined manufacturing device having said next order corresponding to the due order of supplying when said kind of the next start product coincides with said kind of the product processed in said predetermined manufacturing device;

the step of determining whether or not a kind of any products in succeeding end orders of devices, such as the next processing end device, the device having two orders after the next processing end device and the device having three orders after next processing end device, is the same kind of said next start product, after temporarily stopping supply of the product in due order when said kind of said next start product differs from said kind of product in the next processing end manufacturing device;

the step of supplying the same kind of the product to said predetermined manufacturing device after waiting for the end of a present processing of said predetermined manufacturing device when the kind of the next start product coincides with any of said succeeding end orders of processing;

the step of selecting and supplying to said predetermined manufacturing device the product having the same kind of said predetermined manufacturing device prior to the product having a different kind, from said product standby portion under the same conditions in the previous step;

the step of determining if a manufacturing device which is processing a product of a kind which differs from any of the kinds of products of several succeeding standby orders when the kind of the next standby product differs from any of the kinds of products processed in any of the manufactured devices;

the step of changing the kind of product in said manufacturing device which has been determined in a previous determination step and is processing the product of the kind differing from any of the kinds of products presently undergoing processing in one of the processing manufacturing devices when the device ends the present processing; and the step of supplying the product of the kind having the fist supply order and different from the kind of any devices presently undergoing processing in said one of the processing devices, to a determined manufacturing device.

5. A production management apparatus in a production system for semiconductor devices comprising:

determining means for receiving production completion information from each of a number of manufacturing apparatuses for products of the same type as the type of product being processed by the manufacturing apparatus that gave, without resort to a timer, the production completion information for said next start standby product group, for determining said manufacturing apparatus that gave said production completion information for the same type priority of allocation for start of manufacture of a product of the same type instead of starting another manufacturing apparatus, even if said other manufacturing apparatus is in a status that enables processing of a next product prior to said manufacturing apparatus that gave said production completion information, and a means for determining, when production completion information is received from each of said number of manufacturing apparatuses, a product of a same type as the next start product, even if the determined product is a product of the same type as a product being processed by a manufacturing apparatus that gave production completion information at the time of receipt of said production completion information and exists among said number of next start standby products, and when there are not products of the same type as a product that was being processed by a manufacturing apparatus that gave the production completion information, determining a product type other than a product type that was the object of priority allocation as said next start product and giving a next product start instruction to a manufacturing apparatus which gave said production completion information.

* * * * *